United States Patent [19]

Harriett

[11] Patent Number: 4,787,780

[45] Date of Patent: * Nov. 29, 1988

[54] METHOD OF WATERPROOFING WITH A SELF-HEALING BENTONITE SHEET MATERIAL COMPOSITE ARTICLE

[75] Inventor: Todd D. Harriett, Elk Grove Village, Ill.

[73] Assignee: American Colloid Company, Arlington Heights, Ill.

[ * ] Notice: The portion of the term of this patent subsequent to Mar. 29, 2005 has been disclaimed.

[21] Appl. No.: 118,616

[22] Filed: Nov. 9, 1987

Related U.S. Application Data

[63] Continuation of Ser. No. 816,266, Mar. 4, 1986, Pat. No. 4,733,989, and a continuation of Ser. No. 676,279, Nov. 29, 1984, Pat. No. 4,656,062, said Ser. No. 816,266, is a continuation-in-part of Ser. No. 676,279, , which is a continuation-in-part of Ser. No. 604,990, Apr. 27, 1984, Pat. No. 4,634,926, which is a continuation-in-part of Ser. No. 443,225, Nov. 22, 1982, Pat. No. 4,534,925.

[51] Int. Cl.$^4$ .............................................. E02D 31/02
[52] U.S. Cl. ................................. 405/270; 52/169.14
[58] Field of Search ................. 405/52, 107, 109, 263, 405/264, 267, 270; 52/169.14

[56] References Cited

U.S. PATENT DOCUMENTS

| | | | |
|---|---|---|---|
| 2,190,003 | 2/1940 | Van Hulst | 405/270 |
| 2,277,286 | 3/1942 | Bechtner | 405/107 |
| 2,771,745 | 11/1956 | Bramble | 405/270 |
| 3,160,512 | 12/1964 | Cash et al. | 405/270 |
| 3,186,896 | 6/1965 | Clem | 405/107 |
| 3,234,741 | 2/1966 | Ionides | 405/270 |
| 3,326,001 | 6/1967 | Stapelfeld | 405/270 |
| 3,380,254 | 4/1968 | Rossi | 405/270 |
| 3,415,022 | 12/1968 | Schaefer et al. | 405/270 |
| 3,474,625 | 10/1969 | Draper et al. | 405/270 |
| 3,563,038 | 2/1971 | Healy et al. | 405/45 |
| 3,630,762 | 12/1971 | Olton et al. | 405/107 |
| 3,654,765 | 4/1972 | Healy et al. | 405/45 |
| 4,035,543 | 7/1977 | Draper et al. | 405/270 |
| 4,209,568 | 6/1980 | Clem | 405/270 |
| 4,255,067 | 3/1981 | Wright | 405/129 |
| 4,279,547 | 7/1981 | Clem | 405/270 |
| 4,344,722 | 8/1982 | Blais | 405/270 |
| 4,501,788 | 2/1985 | Clem | 405/107 |
| 4,534,925 | 8/1985 | Harriett | 405/270 |
| 4,534,926 | 8/1985 | Harriett | 405/270 |
| 4,733,989 | 3/1988 | Harriett | 405/43 |

FOREIGN PATENT DOCUMENTS

| | | | |
|---|---|---|---|
| 2040655 | 9/1980 | United Kingdom | 405/43 |
| 2056236 | 3/1981 | United Kingdom | 405/43 |

*Primary Examiner*—David H. Corbin
*Attorney, Agent, or Firm*—Mason, Kolehmainen, Rathburn & Wyss

[57] ABSTRACT

The present invention relates to a method of waterproofing using a layered water sealing article of manufacture including a layer of a flexible sheet material adhered to a layer of a composition comprising a non-hydrated water-swellable clay intimately contacted with a polypropene, polybutene, or mixtures thereof. The water swellable clay composition can be adhered to the flexible sheet material in any manner, such as by extruding the composition in sheet form onto a layer of sheet material. The clay composition layer is sufficiently tacky to adhere to the sheet material on one major surface, and is sufficiently tacky for adherence to a wall or conduit, floor or roof on an exposed major surface in areas of potential water flow to prevent the seepage of water through the bentonite clay composition layer. In one embodiment, the clay composition layer includes a polypropene and/or a polybutene and an elastomer, such as butyl rubber, having sufficient resilience to stretch or expand with the expanding water-swellable clay composition upon hydration and to aid in maintaining the structural integrity and cohesiveness of the clay composition. In another embodiment, the clay composition layer comprises a water-swellable clay, an elastomer, and any plasticizer compatible with the elastomer.

20 Claims, 2 Drawing Sheets

METHOD OF WATERPROOFING WITH A SELF-HEALING BENTONITE SHEET MATERIAL COMPOSITE ARTICLE

CROSS REFERENCE TO RELATED APPLICATIONS

This application is a continuing application of co-pending application Ser. No. 816,266 filed Mar. 4, 1986, now U.S. Pat. No. 4,733,989, and application Ser. No. 676,279, filed Nov. 29, 1984, now U.S. Pat. No. 4,656,062. U.S. pending application Ser. No. 816,266 filed Mar. 4, 1986 is a continuation-in-part of application Serial No. 676,279, now U.S. Pat. No. 4,656,062, which is a continuation-in-part of application Serial No. 604,990, filed Apr. 27, 1984, now U.S. Pat. No. 4,634,926, which is a continuation-in-part of application Ser. No. 443,225, filed Nov. 22, 1982, now U.S. Pat. No. 4,534,925.

FIELD OF THE INVENTION

The present invention is directed to a method of waterproofing using a sheet material including a cohesive, fully expandable, non-hydrated water-swellable clay composition layer adhered to a flexible water-permeable or water-impermeable support layer to provide a water seal layer and to a method of waterproofing with the sheet material. The bentonite composition is capable of expanding upon hydration outwardly from every water contacting surface in a new and unexpected manner while maintaining the cohesive integrity of the clay composition. In this manner, if the support layer is, or becomes, water-permeable, the water swellable clay composition layer will expand to seal the water permeable areas of the support sheet to prevent water penetration through the clay composition. More particularly, the present invention is directed to a method of waterproofing using a layered water-sealing article comprising a non-hydrated water-swellable clay intimately contacted, in one embodiment, with a polypropene, polybutene, or mixtures thereof to provide a formable and shapable non-aqueous water swellable clay composition layer particularly useful as a water barrier in sheet form adhered to a flexible sheet of support material. The water swellable clay composition layer can be extruded in the form of a sheet or the like and is sufficiently tacky for adherence to a water-permeable or water-impermeable layer of support material. The bentonite composition and sheet material composite article is applied such that the composition adheres to a conduit, floor or roof in areas of potential water flow with the sheet material facing toward the potential water path to prevent the seepage of water through the bentonite composition layer. In one embodiment, the water swellable clay composition layer includes an elastomer such as butyl rubber having sufficient resilience to stretch or expand with the expanding clay upon hydration and to aid in maintaining the structural integrity and cohesiveness of the composite water swellable clay composition-sheet material article of the present invention.

BACKGROUND OF THE INVENTION

Many attempts have been made to provide a bentonite composition having sufficient cohesiveness and structural integrity to provide a modeling clay-like or putty-like consistency. Such bentonite compositions can be in a paste or putty-like form for handleability so that a desired quantity can be applied in a selected location for water seepage control. A major problem associated with attempting to provide a bentonite composition with a paste or putty-like consistency in order to provide the desired handleability is that many additives used to provide such consistency interfere with the swelling capacity of the bentonite. One attempt to provide a bentonite composition with a putty-like consistency is described in the Bechtner U.S. Pat. No. 2,277,286 wherein water is added to the bentonite to hydrate a portion of the bentonite to achieve the desired consistency. The resulting composition is a putty-like mass which is sufficiently cohesive as a result of the partial swelling of the bentonite, but the swellability of the bentonite is substantially retarded since only about 70–80% of its potential absorbing and swelling characteristics are retained. Further, the Bechtner mass will only adhere to surfaces so long as it remains moist.

Other attempts have been made to provide a bentonite composition having a handleable consistency such as in a paste-like or putty-like form while retaining the full swelling properties of the bentonite by the addition of non-aqueous liquids, such as set forth in this assignee's prior U.S. Pat. No. 4,279,547 and the McGroarty U.S. Pat. No. 4,316,833. Generally, the addition of liquid organic additives to bentonite will inhibit the swelling capacity of the bentonite to various degrees depending on the characteristics of the organic additive, and most notably dependent upon the polarity of the organic additive. In accordance with the McGroarty U.S. Pat. No. 4,316,833, an attempt is made to provide a cohesive bentonite composition having a paste-like consistency without hydrating the bentonite by the addition of adhesive agents, such as hydrocarbon resins. In accordance with the McGroarty U.S. Pat. No. 4,316,833 "if the adhesive penetrates the bentonite, it will destroy the ability of the bentonite to swell and thus will destroy its waterproofing capabilities". In an attempt to prevent the adhesive agent penetration, the McGroarty bentonite is first saturated with a liquid fluidizer, such as mineral spirits, to prevent the adhesive agent from substantially penetrating the bentonite particles after saturation with the liquid fluidizer.

This assignee's prior U.S. Pat. Nos. 4,209,568 and 4,279,547 describe other attempts to provide a bentonite composition having a consistency for good handleability such as a stiff putty-like consistency without hydrating the bentonite and without saturation of the bentonite with bentonite-inhibiting organics by forming a gel and adding the bentonite to the gel to prevent bentonite saturation while maintaining its swellability.

The Ishido U.S. Pat. No. 4,366,284 discloses a bentonite composition having 10–40% rubber, 10–40% plasticizer and 10–20% silicic filler. The silicic filler in an amount of at least 10% by weight is disclosed to be critical for swellability. In accordance with one embodiment of the present invention, it has been found that the compositions of the present invention achieve substantially increased swellability so long as the composition contains essentially no silicic filler.

It has been found that the composition set forth in this assignee's prior U.S. Pat. No. 4,279,547 and in the McGroarty U.S. Pat. No. 4,316,833, while generally satisfactory in terms of composition consistency and maintenance of swellability, inhibit the swelling of the bentonite to a limited extent. A number of patents disclose the use of a liquid impermeable liner of polymeric sheet material, bentonite clay, or layers of the two to prevent escape of liquid or liquid waste materials to the surrounding environment. Examples of such patents include Wright U.S. Pat. No. 4,255,067; Draper et al. U.S. Pat. No. 4,035,543; and Blais U.S. Pat. No. 4,344,722.

Other patents disclose the use of various plastic sheet or resin materials as water-proofing layers: Ionides U.S. Pat. No. 3,234,741; Stapelfeld U.S. Pat. No. 3,326,001; Berry U.S. Pat. No. 3,383,863; Schaefer et al. U.S. Pat. No. 3,415,022; and Draper et al. U.S. Pat. No. 3,474,625. The following patents disclose the use of asphalt or other bituminous material together with other materials, reinforcements or liners for lining earthen formations: VanHulst U.S. Pat. No. 2,190,003; Bramble U.S. Pat. No. 2,771,745; Cash et al. U.S. Pat. No. 3,160,512; and Rossi U.S. Pat. No. 3,380,254. The VanHulst U.S. Pat. No. 2,190,003 discloses the combination of bituminous substances and clay for admixture with soil.

In accordance with the present invention, it has been found that bentonite intimately admixed with polypropene, polybutene, or mixtures thereof will form a bentonite composition having a paste-like or putty-like consistency; sufficient tack to be adhered to a wall, floor, roof, conduit and the like; and most suprisingly and unexpectedly will increase the swelling capacity of the bentonite. In accordance with another embodiment of the present invention, a cohesive bentonite composition includes bentonite, an elastomer, and a plasticizer compatible with the elastomer. The compositions of the present invention readily adhere to a layer of flexible sheet material to provide a composite sheet material laminate. When adhered to a water-impermeable sheet layer, any holes or cracks formed in the sheet material layer when the composite material is applied, or during aging, will be self-healed upon contact of water on the bentonite composition immediately below the hole or crack to prevent water seepage through the composite sheet material.

SUMMARY OF THE INVENTION

In brief, the present invention is directed, in one embodiment, to a method of waterproofing an area of potential water flow, particularly beneath horizontal concrete structures using a laminate including a flexible sheet material adhered to a non-hydrated, water swellable clay composition layer comprising an intimate mixture of a water swellable clay, such as bentonite clay, with polypropene, polybutene, or mixtures thereof. In accordance with another embodiment of the present invention, an elastomer such as partially cross-linked butyl rubber is included in the clay composition layer. The elastomer has sufficient resiliency to stretch upon hydration of the water-swellable clay layer and adds structural integrity to the clay composition layer. To achieve the full advantage of the present invention, the clay compositions forming part of the laminates of the method of the present invention, with and without an elastomer, include polypropene or polybutene in an amount of at least 10% by total weight to provide a swelling capacity more than the water-swellable clay alone. After intimate admixture of the the water-swellable clay with the polypropene, polybutene or mixtures, additional additives such as tackifiers, viscocity modifiers, thickeners, extenders and the like may be added. The polypropene and/or polybutene add sufficient tackiness to the clay composition and completely wet-out the clay upon initial intimate mixing to prevent substantial inhibition of the swelling properties of the clay. Further, the polypropene and/or polybutene components of the composition layer of the laminates of the method of the present invention do not dry out over substantial periods of time in addition to providing the new and unexpected increase in swelling capacity of the water-swellable clay. Additionally, the capacity for polypropene and polybutene to wet-out the water-swellable clay composition layer enables the water-swellable clay composition layer to contain 85-90% water-swellable clay, e.g. bentonite, with 10-15% polypropene and/or polybutene while maintaining the tackiness and cohesive handleability of the composition.

In accordance with one important embodiment of the present invention, the clay composition layer of the laminates used in the method of the present invention includes a water-swellable clay, such as bentonite, an elastomer, such as partially cross-linked butyl rubber, and a plasticizer compatible with the elastomer. The elastomer is capable of stretching with the clay upon hydration to a greater degree with the included plasticizer to more effectively fill any water-permeable areas in an adhered sheet material intended to provide a second water-impermeable layer.

Accordingly, an object of the present invention is to provide an article of manufacture including a flexible support sheet adhered to a non-hydrated, cohesive water-swellable clay composition layer containing a water-swellable clay, polypropene and/or polybutene having new and unexpected swelling capabilities.

Another object of the present invention is to provide a method of waterproofing an area of potential water flow with an article of manufacture including a flexible support sheet adhered to a non-hydrated, cohesive water-swellable clay composition layer containing a water-swellable clay, polypropene and/or polybutene having new and unexpected swelling capabilities.

Still another object of the present invention is to provide a method of waterproofing using an article of manufacture including a flexible support sheet adhered to a non-hydrated, cohesive water-swellable clay composition layer having new and unexpected structural integrity in sheet form including a water-swellable clay, polypropene and/or polybutene and an elastomer.

A further object of the present invention is to provide a method of waterproofing an area of potential water flow with an article of manufacture including a flexible support sheet adhered to a non-hydrated, cohesive water-swellable clay composition layer having new and unexpected structural integrity in sheet form including a water-swellable, polypropene and/or polybutene, and an elastomer.

Another object of the present invention is to provide a method of waterproofing an area of potential water flow, particularly in a substantially horizontal area disposed beneath split slab concrete constructions, such as packing decks and plaza areas, to seal between the below adjacent concrete slabs using an article of manufacture including a water-permeable or water-impermeable flexible support sheet adhered to a layer of a water-swellable clay composition comprising 35 to 90% by weight of a water-swellable clay, such as bentonite, and 10 to 65% by weight polypropene, polybutene or mixtures thereof.

Still other objects of the present invention are to provide an article of manufacture including a layer of liquid-impermeable or liquid permeable flexible sheet material adhered to a new and improved water-swellable clay composition and a method of water-proofing using the article of manufacture wherein the clay composition layer includes a water-swellable clay, an elastomer, and a plasticizer compatible with the elastomer resulting in a composite article having extremely good structural integrity wherein the water-swellable clay is not substantially inhibited from swelling.

DETAILED DESCRIPTION OF THE PRESENT INVENTION

In accordance with the present invention, a water swellable clay intimately mixed with a polypropene, a polybutene or a mixture of polypropene and polybutene will provide a bentonite composition having a desired consistency ranging from a soupy liquid to a relatively stiff putty-like and tacky solid and having new and unexpected capacity for swelling. The water swellable clay, for example bentonite, is included in the clay composition layer in an amount of about 35% to about 90% by weight and the polypropene and/or polybutene is included in the clay composition layer in an amount of about 10% to about 65% by weight of the composition.

To achieve the full advantage of the present invention, the clay composition layer should include polypropene, polybutene or mixtures thereof in an amount of at least 15% by weight. Additional tackifiers compatible with the polypropenes or polybutenes may be included for additonal tack so long as the polypropene, polybutene or mixture is included in at least 10% by weight of the composition. Additional compatible tackifiers may include, for example, aliphatic petroleum hydrocarbon resins such as polyisobutylene, polyterpenes, hydrogenated resins, and mixed olefins. Generally, aromatic tackifiers are not suitable since they will bleed to the surface of the composition and separate thereby reducing the handleability and consistency of the composition. Other additives such as viscosity controlling agents, fillers, tackifiers and the like may be added in a total amount up to about 20% by weight of the bentonite composition to impart any desired physical characteristics to the clay composition layer. However, it has been found that the addition of a silicic filler, e.g. silicic acid or calcium silicate, substantially decreases the water-swellability of the clay composition layer of the present invention. Accordingly, essentially no silicic filler should be added to the clay composition layer. Silicic filler added in an amount of only 1% by weight reduces the water swellability of the clay composition layer by about 10%. Silicic filler added to the clay composition layer in an amount of 5% by weight reduces the water swellability of the clay composition by about 20%. To achieve the full advantage of the present invention, the silicic filler, if any, should be 1% by weight or less of the water-swellable clay composition layer.

Evaporative solvents such as mineral spirits may be added to the clay composition layer of the present invention to aid in mixing, but it is preferred to combine the clay composition layer components without such solvents. In any case, the polypropene, polybutene or mixtures should be present in the final composition, after evaporation of any solvents volatizable under ambient conditions, in an amount of at least 10% by weight.

In accordance with an important feature of the present invention, no additives are necessary to protect the water-swellable clay, polypropene and/or polybutene composition layer of the composite articles of the present invention since the polypropenes and polybutenes will completely wet out the water-swellable clay in amounts up to about 90% by weight water-swellable clay without inhibiting the swelling characteristics of the clay. Quite unexpectedly, the polypropene and/or polybutene component increases the capacity of the water-swellable clay composition to swell while providing sufficient tack so that the clay composition layer easily can be adhered to substantially any surface over extended periods of time.

The water-swellable colloidal clay utilized in the clay composition layer of the multi-layered articles used in the method of the present invention is any water swellable colloidal clay which will hydrate in the presence of water, i.e., will swell in the presence of water. In accordance with one important embodiment of the present invention, the colloidal clay is bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations such as magnesium and iron. There are cases wherein a montmorillonite predominant in calcium ions can be converted to a high swelling sodium variety through a well known process called "peptizing". The colloidal clay utilized in this invention may be one or more peptized bentonites. The colloidal clay may also be any member of the dioctahedral or trioctahedral smectite group or mixtures thereof. Examples are Beidellite, Nontronite, Hectorite and Saponite. The colloidal clay, i.e., bentonite, generally is finely divided as known for use in water barrier panels and the like, i.e, 150 to 350 mesh.

The polybutenes forming part of the water-swellable clay composition layer, in accordance with the principles of the present invention, generally comprise $(C_4H_8)_n$, where n ranges from about 6 to about 45, having average molecular weights in the range of about 300 to about 2,500. The commercially available useful polybutenes are predominantly of high molecular weight mono-olefins and can include 100% of the polybutene or include up to about 10% isoparaffins. The polybutenes are chemically stable, permanently fluid liquids and their tackiness increases with increased molecular weight. The viscosities of the polybutenes range from a consistency of a light oil to a highly viscous fluid having a viscosity range of about 25 to about 4,000 centipoises. The lower viscosity polybutenes can be combined with a water-swellable clay to provide a composition having a soupy consistency which is very tacky and difficult to handle depending upon the quantity of water-swellable clay included within the clay composition layer of the multi-layer articles of the present invention.

The polypropenes forming part of the water-swellable clay composition layer, in accordance with the principles of the present invention, generally comprise $(C_3H_6)_n$ where n ranges from about 7 to about 60 having molecular weights in the range of about 300 to about 2,500. The commercially available polypropenes useful in the clay composition layer, in accordance with the present invention, generally are amorphous in character and may be combined with up to about 10% by weight of a suitable processing solvent, such as ligroin, although the polypropenes may be blended with the bentonite easily at elevated temperatures i.e., 200° C. without a solvent.

To achieve the greatest swelling of the compositions of the present invention, the polypropene or polybutene or mixtures should be present in the composition in an amount of about 15% to about 30% by weight of the total composition.

In testing to determine if the polypropenes and polybutenes would inhibit the swelling characteristics of the water-swellable clay layer, two compositions were prepared in accordance with the present invention-the first containing approximately 78% bentonite and 22% polybutene and the second containing about 78% bentonite and 22% polypropene. For comparison, one gram of bentonite alone was placed in one graduated cylinder while one gram of the above two compositions of the present invention were placed in a second and third graduated cylinder. Each of the compositions were wetted and permitted to swell for about 48 hours. After complete swelling, it was found that the bentonite alone swelled to a volume of about 9 ml while the two compositions of the present invention containing polypropene or polybutene swelled to a volume of 10 ml.

In accordance with another important feature of the present invention, it has been found that the addition of an elastomer in an amount of about 1% to about 20% based on the total weight of the water-swellable clay composition layer of the multi-layered articles used in the method of the present invention will substantially increase the handleability of the composition without impeding its swellability. To achieve the full advantage of this embodiment of the present invention, the elastomer should be included in an amount of about 2% to about 10% based on the total weight of the clay composition layer. Surprisingly, it has been found that mastication or shearing, i.e. in a sigma blender, of a water-swellable clay composition containing a water-swellable clay, such as bentonite, polypropene and/or polybutene, and an elastomer, actually increases the capacity of the composition to swell in an amount greater than the water-swellable clay alone; and greater than the water-swellable clay, polypropene/polybutene composition without the elastomer.

In testing the swellability of the water-swellable clay composition layers of the present invention including an elastomer, the two clay compositions prepared above (polybutene and polypropene) were blended separately in a sigma blender with 4.95% partially cross-linked butyl rubber to thoroughly masticate the butyl rubber into the compositions to form two homogeneous blends. One gram of each of the compositions containing 4.95% butyl rubber, 75.25% bentonite clay and 19.8% of polybutene or polypropene were placed in two graduated cylinders and submerged in water for approximately 48 hours to make sure that the compositions were completely swelled. When completely swelled, one gram of each composition containing the butyl rubber had swollen to approximately 13-14 ml—greater than the swelling which occurred with one gram of bentonite alone and greater than the swelling which occurred with the bentonite/polypropene or bentonite/polybutene compositions, although these compositions without elastomer actually included more bentonite. The compositions containing the butyl rubber were easily handleable and extrudeable to any desired shape and would retain their form when adhered to a surface for water seepage control.

Essentially any elastomer having at least 100% elongation and, in accordance with an important feature of the present invention having at least 500% elongation, can be used in the water-swellable clay composition layer of the present invention to substantially improve the handleability, cohesiveness and structural integrity of the water-swellable clay composition layer and multi-layered articles manufactured. Partially, cross-linked elastomers have been found to be most suitable in improving the consistency, handleability and structural integrity of articles requiring such properties, but elastomers which are not crosslinked are also useful, particularly those polymers which are capable of being lightly cross-linked when subjected to the heat generated within the blender, i.e. sigma blender, during mastication and mixing with the other clay composition layer components. Fully cross-linked elastomers generally are not suitable for incorporation into the clay composition layers of the present invention since their elongation capacity is insufficient to permit full expansion of the water-swellable clay during hydration. However, any elastomer having at least 100% elongation is suitable as a component of the water-swellable clay composition layer of the multi-layered or laminated articles described herein, and included within the scope of the present invention.

To achieve the full advantage of the present invention, the elastomers should have an elongation of at least 500% to allow for the new and unexpected clay swelling discovered in accordance with the principles of the embodiment of the invention directed to intimately contacting bentonite with polypropene and/or polybutene to form the water-swellable clay composition layer of the articles of the present invention. Another suitable elastomer includes polyisobutylene. Additional suitable elastomers for incorporation into the clay composition layer include styrene-butadiene, synthetic and natural rubbers, ethylene-propylene copolymers and terpolymers, halogenated butyl rubber, and partially cross-linked butyl rubbers having divinylbenzene added to form a terpolymer for the purpose of imparting a degree of "cure". The elastomer can be shredded prior to mastication with the water-swellable clay and polypropenes and/or polybutenes to decrease mixing time, although shredding is not necessary. Mastication and homogeneous flow of the elastomer throughout the water-swellable clay composition layer can be achieved with the elastomer in any desired shape, i.e., pellet form, for example in a sigma blender.

In accordance with another important feature of the present invention, the water-swellable composition layers disclosed herein can include additives capable of forming a skin on the composition, such as a copolymer of vinyl toluene with a vegetable drying oil. The compositions containing skins are useful wherever the composition does not require tackiness for securing the composition to its intended location. If tackiness is desired, a surface coating of any suitable tackifier may be applied over the skin.

In accordance with still another important embodiment of the present invention, a water-swellable clay composition layer is provided including a water-swellable clay, such as bentonite, in an amount of 35-90% by weight, an elastomer in an amount of 1-20% by weight, and any plasticizer compatible with the elastomer and capable of plasticizing the elastomer, in an amount of 2-50% by weight based on the total weight of the clay composition layer. The plasticizer improves the workability of the elastomer, extends the elastomer, enables the elastomer to re-position itself with expansion of the water swellable clay when the clay is wetted and wets the water-swellable clay surface sufficiently to enable the elastomer to accept substantial amounts of the water-swellable clay (up to about 90%) and to provide a homogeneous clay distribution throughout the elastomer in the clay composition layer.

It has been found that an elastomer having an elongation of at least 100% will permit the water swellable clay to substantially completely expand upon water contact so long as the elastomer includes a plasticizer in an amount of at least 2% based on the total weight of the clay composition layer. The elastomer provides exceptionally good structural integrity to the clay composition layer without substantially inhibiting the swellability of the clay. The elastomers should be partially, but not completely, cross-linked and include, for example, butyl rubber, styrene-butadiene, other synthetic and natural rubbers, ethylene-propylene copolymers, ethylene and propylene terpolymers.

Suitable plasticizers are the relatively low polarity plasticizers including epoxidized oils, such as epoxidized soybean oil; alkyl monesters such as butyl oleate; long chain partial ether esters, such as butyl cellosolve oleate; long chain alkyl diesters, such as dioctyl adipate and dioctylphthalate; and petroleum-derived plasticizers such as aromatic-napthenic oils; napthenic-aromatic oils; napthenic-paraffinic oils; and paraffinic oil.

To achieve the full advantage of this embodiment of the present invention, the plasticizer should be included in the clay composition layer in an amount of at least 10% by weight of the composition to plasticize the elastomer and fully wet-out the bentonite. The plasticizers generally are included in an amount of 10-30%.

Figures 1, 2:
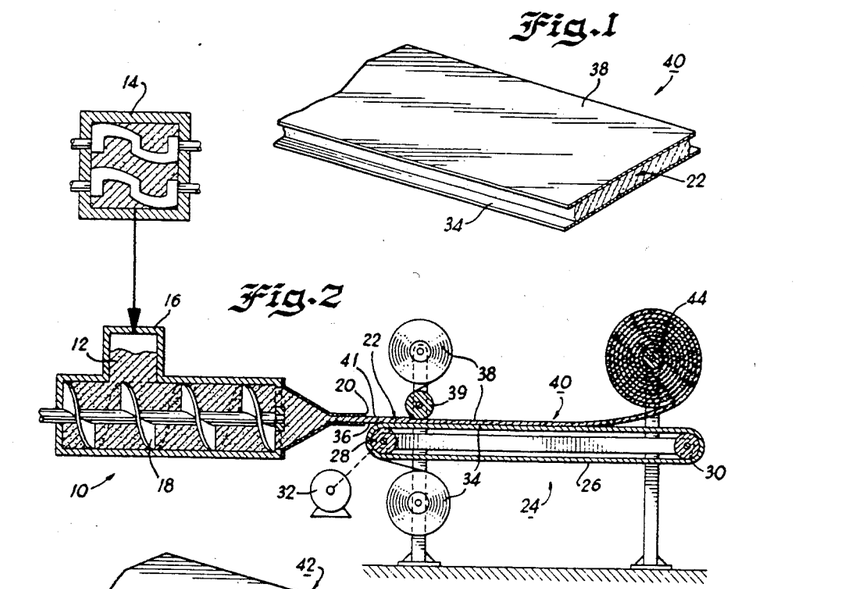
FIG. 1 is a partially broken-away perspective view of an article of manufacture of the present invention including a water-impermeable top sheet, a lower release sheet and an intermediate bentonite composition layer.
FIG. 2 is a schematic view of the apparatus used to manufacture the article of manufacture of FIG. 1.

Turning now to the drawing, and initially to FIG. 2, apparatus generally designated 10, is illustrated in schematic form for extruding the clay composition layer of the multi-layer articles used in the method of the present invention into sheet form. The water-swellable clay composition 12 comprising an intimate mixture of bentonite, with polypropene and/or polybutene in one embodiment, or with a plasticizer in another embodiment, is thoroughly blended in a homogeneous blend with an elastomer, such as butyl rubber, in a sigma blender 14 to fully masticate the elastomer to provide a homogeneous bentonite composition into an extruder 16. Auger 18 of extruder 16 forces the bentonite composition through a die opening 20 in extruder 16 to form a sheet, generally designated 22, of water-swellable clay composition. The sheet of material 22 is directed onto a conveyor, generally designated 24, including an endless conveyor belt 26 driven around rollers 28 and 30 by a conveyor motor 32. The conveyor 24 can be driven at a variety of predetermined speeds by the conveyor motor 32. By varying the speed of the conveyor belt 26 relative to the speed at which the extruded sheet 22 exits the die opening 20, the sheet can be stretched or compressed slightly to vary the thickness of the extruded clay composition sheet 22. The conveyor 24 includes a continuous supply of release paper 34 or suitable geotechnical fabric 35 (FIG. 4) directed over the conveyor belt 26 for contact against an undersurface 36 of the sheet 22 being extruded through the die opening 20 of extruder 16.

A continuous supply of a water-impermeable sheet material 38 is disposed above the conveyor 24 to direct the sheet material 38 around contact roller 40 to adhere the sheet material 38 to an upper surface 41 of the bentonite composition sheet 22. The resulting laminated article of manufacture, generally designated 40 (FIG. 1) and 42 (FIG. 4), is wound around a take up roller 44 as the bentonite composition sheet 22 is extruded onto the release paper 34 or fabric 35 to provide the laminate 40 or 42, respectively, in a coiled, roll form. Similarly, the sheets 40 and 42 may be cut to length at a suitable cutting station (not shown).

Figures 3, 4:
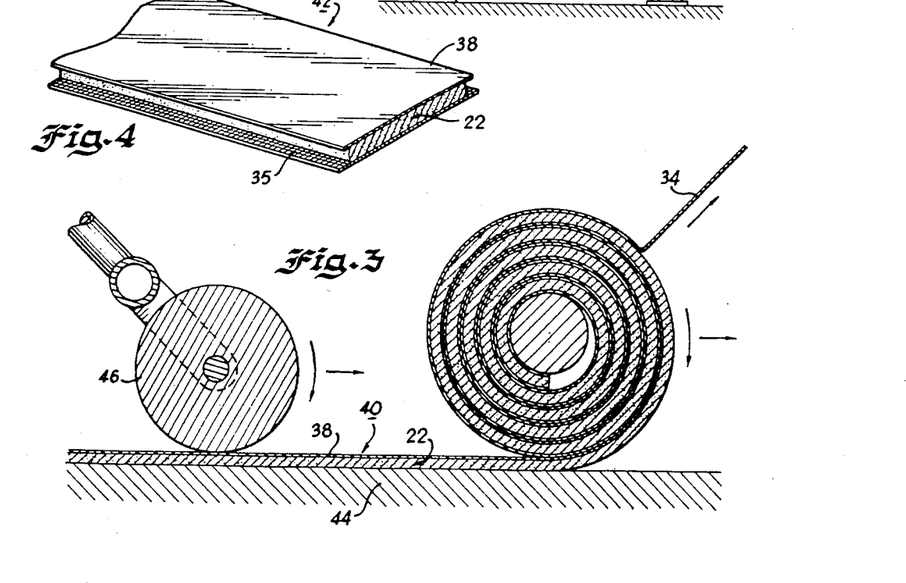
FIG. 3 is a side view showing a roll of the sheet material FIG. 1 being applied to a soil or building material surface while the release sheet is stripped away.
FIG. 4 is a partially broken-away perspective view of another article of manufacture of the present invention, similar to the article of FIG. 1, but having a fabric lower layer instead of a lower release sheet.

In accordance with an important feature of the present invention, the upper sheet material layer 38 of the laminated articles of manufacture 40 and 42 of the present invention should be water-impermeable to provide two water-proofing seals. The upper sheet material layer 38, under ideal conditions and proper installation will, by itself, prevent water or other liquids from penetrating the laminate 40 or 42. Frequently, however, it has been found that imperfect installation, particularly at seams, permits water or other liquid from penetrating a water impermeable layer intended for water proofing. Additionally, sometimes cracks or fissures develop in a "water-impermeable" sheet material permitting water penetration.

It has been found, quite unexpectedly, that the bentonite compositions of the present invention will expand to an unexpected volume upon water contact while maintaining structural integrity to permanently fill any cracks, fissures or gaps left from improper installation, thereby acting as an unexpectedly effective safety valve to insure that the laminate 40 or 42 self heals to prevent essentially all liquid penetration to the earthen structure or building material 44 thereunder.

The bentonite composition 12 of the present invention is particularly effective when applied to building materials, such as wood, concrete, rock and the like, since the composition is tacky and readily adheres to solid, stable structures. The multi-layer article 40, as best shown in FIG. 3, is particularly effective in waterproofing a substantially horizontal area, e.g., 44, disposed beneath split concrete slabs (not shown) which are disposed over the multi-layer article 40 in FIG. 3. The multi-layer articles are particularly advantageous under concrete slabs of packing decks, plaza areas and the like to seal between and below adjacent concrete slabs.

The water impermeable upper sheet of material 38 can be any flexible, water impermeable sheet material, e.g., 0.5 to 20 mils in thickness, preferably about 4 mils thick, such as polyvinyl chloride, a polyolefin, such as polyethylene or polypropylene and the like. Generally, the thickness of the water-impermeable sheet material 38 is on the order of about 3 to about 50 mils. While the release paper 34 or fabric layer 35 is not essential to the laminates 40 and 42 of the present invention, one or the other permits the laminate to be rolled upon itself and easily unrolled and applied, as shown in FIG. 3. A suitable weighted roller 46, as shown in FIG. 3, is applied to the laminate 40 during application while the release paper 34 is stripped away to ensure that the bentonite composition sheet 22 is completely adhered to the building material 44.

The geotechnical fabrics 35 (FIG. 4) are substituted for the release paper 34 when the laminate 42 is applied over an earthen surface for ease of application. The fabric 35 is left in place on the undersurface 36 of the bentonite composition sheet 22 when the laminate 42 is applied over an earthen surface so that the laminate sheets 42 can be shifted in proper adjacent positions to provide effective sealing between laminate sheets 42. Any suitable fabrics can be used for this purpose, particularly since the fabrics have no water-impermeability purpose other than to achieve proper installation. Suitable fabrics include woven and non-woven permeable and non-permeable fabrics made from polypropylene, polyesters, nylon, propylene-ethylene copolymers, polypropylene-polyamide copolymers, and the like. The geotechnical fabrics are preferred for their bacteriological and chemical resistance. The thickness of the fabric is not important and such fabrics generally are available in thicknesses of 3 to about 30 mils.

The sheet materials including butyl rubber and those having a very high percentage of bentonite, e.g. 70-90% bentonite, sometimes are difficult to extrude into wide sheets, as shown in FIG. 1. Accordingly, in accordance with another important feature of the present invention, alternate apparatus, shown schematically in FIGS. 5 and 6, is capable of forming sheet materials from the clay compositions of the present invention.

Figure 5:
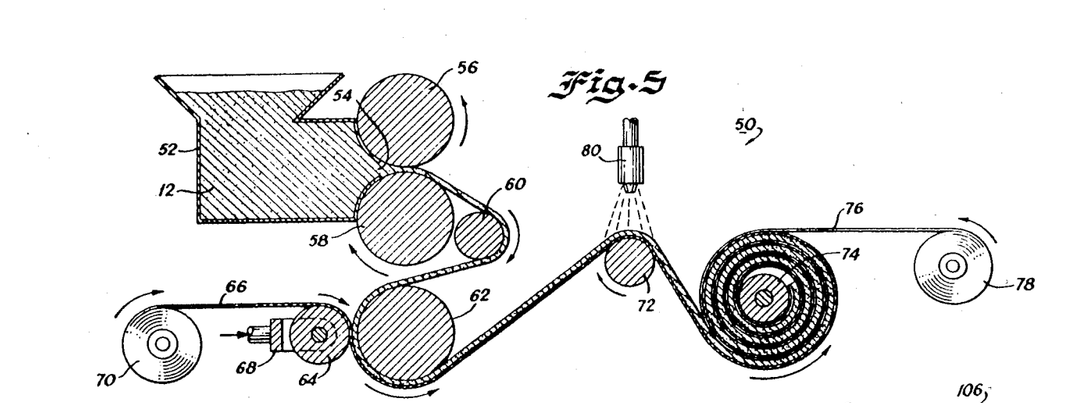
FIGS. 5 and 6 are schematic vies of alternate apparatus used to manufacture the article of manufacture of FIG. 1, or similar articles of manufacture.
Figure 6:
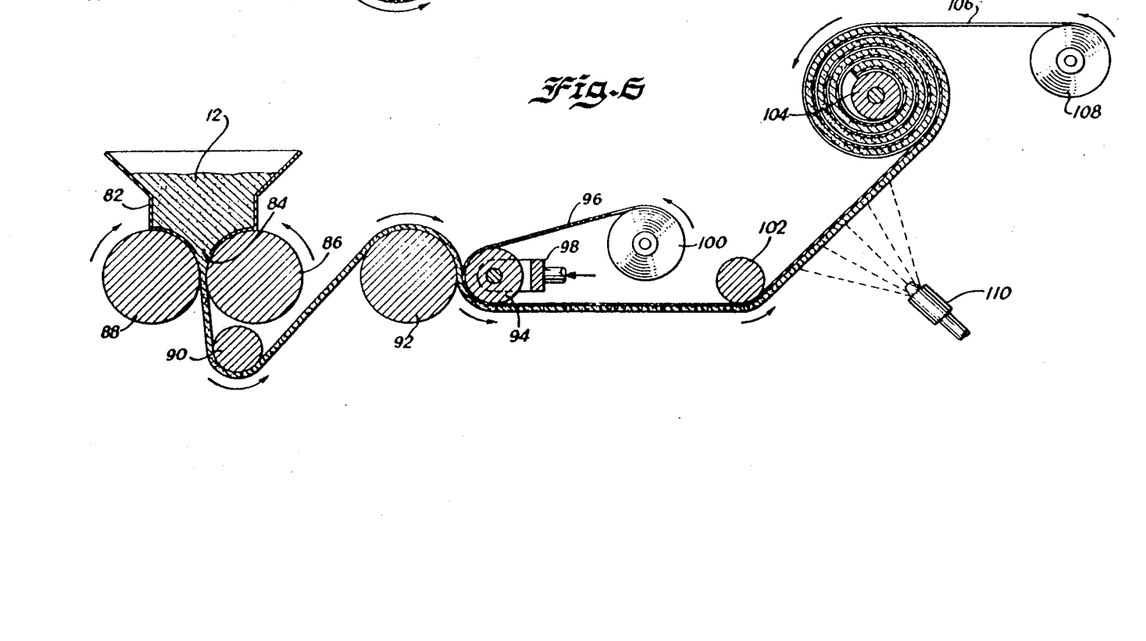

The apparatus of FIG. 5, generally designated 50 is illustrated schematically for forming the clay composition layer and securing a flexible sheet or web and an optional release or fabric layer thereto. The thoroughly blended clay composition 12 is received in a hopper 52 having a discharge opening 54 disposed in horizontal alignment with a pair of forming rollers 56 and 58 having a predetermined spacing to provide a clay composition layer of a desired thickness. The forming rollers 56 and 58 are motor (not shown) driven clockwise to push the clay composition through the spacing between them and shape the clay composition into sheet form. It has been found that a suitable lubricant, such as a polyglycol, e.g. polyethylene glycol, in an amount of about 0.5% to 2.0% by weight, added to the clay composition, aids in preventing the clay composition from sticking to the forming rollers 56 and 58 and other apparatus during manufacture.

The clay composition, in sheet form, is conveyed over a directional roller 60 and then between pressure rollers 62 and 64 where a sheet or web of water-impermeable flexible sheet material 66 is adhered to the clay composition sheet material. The flexible sheet material 66 can be the same as the sheet material layer 38 described with references to FIGS. 1–4. The pressure applied on the sheet or web of water-impermeable flexible sheet material 66 can be adjusted to make sure the sheet material 66 adheres to the clay composition by adjusting yoke 68 to move the pressure roller 64 closer to or farther from pressure roller 62. The sheet material 66 is supplied between the pressure rollers 62 and 64 from a supply roll 70 of water-impermeable flexible sheet material.

The clay composition sheet material having a sheet or web of water-impermeable sheet material 66 applied thereto proceeds over directional roller 72 and is wound onto a take-up roller 74. During winding on take-up roller 74, a layer of a release material or fabric 76 can be applied over the clay composition sheet material to sandwich the clay composition sheet material between the optional release or fabric material 66 and the flexible sheet material 76. The release material or fabric 66 is optional in many cases, such as when the water impermeable flexible sheet material 66 applied is lubricious, such as a sheet layer of a polyolefin, e.g. polyethylene or polypropylene, and is supplied from supply roll 78, as shown in FIG. 5. If desired, an adhesive can be applied to the clay composition sheet material, such as from spray nozzle 80, prior to applying the release or fabric sheet or web 76 to make sure that the clay composition sticks in place when finally applied by the consumer.

The manufacture of the multi-layer article of manufacture shown schematically in FIG. 6 is very much the same as that shown in FIG. 5 except that the clay composition 12 is initially received in a hopper 82 having a discharge opening 84 disposed vertically above a pair of forming rollers 86 and 88 having a predetermined spacing to provide a clay composition layer of a desired thickness. The vertical disposition of the composition hopper 82 aids, by gravity, in forcing the clay composition 12 between motor (not shown) driven forming rollers 86 and 88.

The formed clay composition, in sheet form, is conveyed under a directional roller 90 and then between pressure rollers 92 and 94 where a sheet or web of water-impermeable, flexible sheet material 96 is adhered to the clay composition sheet material. The sheet material 96 can be the same as the sheet material layer 38 described with reference to FIGS. 1-4.

The pressure applied on the sheet or web of water-impermeable flexible sheet material 96 can be adjusted to make sure the sheet material 96 adheres to the clay composition by adjusting yoke 98 to move the pressure roller 94 closer to or farther from pressure roller 92. The sheet material 96 is supplied between the pressure rollers 92 and 94 from a supply roll 100 of water-impermeable, flexible sheet material 100.

The clay composition sheet material having a sheet or web of water-impermeable sheet material 96 applied thereto proceeds under directional roller 102 and is wound onto a take-up roller 104. During winding on take up roller 104, an optional layer of a release material or fabric 106 is applied over the clay composition sheet material to sandwich the clay composition sheet material between the optional release or fabric material 96 and the flexible, water-impermeable sheet material 96. The release material or fabric 106 is optional in many cases, such as when the water impermeable flexible sheet material 96 applied is lubricious, such as a sheet layer of polyethylene or polypropylene, and is supplied from supply roll 108, as shown in FIG. 6. If desired, an adhesive can be applied to the clay composition sheet material, such as from spray nozzle 110 prior to applying the release or fabric sheet or web 96 to make sure that the clay composition sticks in place when finally applied by the consumer.

I claim:

1. A method of waterproofing an area of potential water leakage comprising disposing a multilayer article of manufacture in contact with said area of potential water leakage to provide a flexible sheet material primary seal and a bentonite composition secondary seal, said multi-layer article of manufacture comprising a first layer of a clay composition including 35% to 90% by weight clay, and 10% to 65% polypropene, polybutene or mixture thereof, adhered to a second layer of a flexible sheet material.

2. The method of claim 1 wherein said clay composition layer comprises 35% to 90% by weight clay; 10% to 64% polypropene, polybutene or mixtures; and 1% to 20% elastomer.

3. The method of claim 1 wherein said clay comprises bentonite and wherein said polypropene, polybutene or mixtures comprises at least 16% by weight of said water-swellable clay composition.

4. The method of claim 3 wherein said flexible sheet material is a water-impermeable layer of polymeric material.

5. The method of claim 1 wherein said multilayer article includes a third layer comprising a sheet of release material releaseably adhered to one major surface of the clay composition layer and wherein the flexible sheet material is adhered to an opposite major surface of the clay composition layer; said method including removing the release material from the multi-layer article and adhering the clay composition layer to the area of potential water flow at the clay composition major surface where the release material was removed, so that water traveling to said area of potential water flow will contact said flexible sheet material first as a first waterproofing layer and, if the water penetrates the polymeric sheet material, the water will contact the clay composition as a second water seal.

6. A method of waterproofing an area of potential water leakage comprising disposing a multi-layer article of manufacture in contact with said area of potential water leakage to provide a polymeric sheet primary seal and a bentonite composition secondary seal, said multi-layer article of manufacture comprising a first layer of polymeric sheet material and a second layer including water-swellable clay in an amount of 35 to 90% by weight of the second layer and an elastomer in an amount of 1% to 20% by weight of the second layer; and polypropene, polybutene or mixtures thereof in an amount of 10% to 65% by weight of the second layer, said second layer having essentially no silicic filler.

7. A method of waterproofing an area of potential water leakage comprising disposing a multi-layer article of manufacture in contact with said area of potential water leakage to provide a polymeric sheet primary seal and a bentonite composition secondary seal, said multi-layer article of manufacture comprising a first layer of a water-impermeable, flexible sheet of polymeric material adhered to a second layer, the second layer comprising a water-swellable clay in an amount of 35% to 90% by weight of the second layer, an elastomer in an amount of 1% to 20% by weight of the second layer, and a plasticizer capable of extending said elastomer in an amount of 2% to 50% by weight of the second layer.

8. The method of claim 7 wherein the elastomer has at least 100% elongation.

9. The method of claim 7 wherein said elastomer is partially cross-linked butyl rubber and said plasticizer is included in an amount of 10–30% by weight.

10. The method of claim 7 wherein said plasticizer is selected from the group consisting of epoxidized oils; alkyl monoesters; long chain (8–20 carbon) alkyl diesters; aromatic- napthenic oils; napthenic-aromatic oils; napthenic-paraffinic oils; and paraffinic oils.

11. A method of waterproofing an area of potential water leakage comprising disposing a multi-layer article of manufacture in contact with said area of potential water leakage to provide a flexible sheet primary seal and a bentonite composition secondary seal, said multi-layer article of manufacture comprising a first layer of flexible sheet or web material and a second layer having essentially no silicic filler material, adhered to said first layer, consisting essentially of a water-swellable clay in an mount of 35% to 90% by weight, an elastomer in an amount of 1% to 20% by weight, and a plasticizer capable of extending said elastomer in an amount of 2% to 50% by weight of the composition.

12. A method of waterproofing an area of potential water leakage comprising disposing a multi-layer article of manufacture in contact with said area of potential water leakage to provide a polymeric sheet primary seal and a bentonite composition secondary seal, said multi-layer article of manufacture comprising a first layer of flexible sheet or web material and a second layer, adhered to said first layer, consisting essentially of a water-swellable clay in an amount of 35% to 90% by weight, an elastomer in an amount of 1% to 20% by weight, and polypropene, polybutene or mixtures thereof in an amount of 2% to 50% by weight of the second layer.

13. A method of waterproofing an area of potential water leakage comprising disposing a multi-layer article of manufacture in contact with said area of potential water leakage to provide a polymeric sheet primary seal and a bentonite composition secondary seal, said multi-layer article of manufacture comprising a first layer of flexible sheet material; and a second layer, adhered to said first layer, comprising a water-swellable clay in an amount of 35% to 90% by weight; polypropene, polybutene or mixtures thereof in an amount of 10% to 65% by weight; and having 0 to 1% by weight of a silicic filler material.

14. A method of waterproofing an area of potential water leakage comprising disposing a multi-layer article of manufacture in contact with said area of potential water leakage to provide a polymeric sheet primary seal and a bentonite composition secondary seal, said multi-layer article of manufacture comprising a first layer of flexible sheet or web material; and a second layer, adhered to said first layer, comprising water-swellable clay in an amount of 35 to 90% by weight of the second layer, and polypropene, polybutene or mixtures thereof in an amount of 10% to 65% by weight of the second layer.

15. The method of claim 14 wherein said polypropene, polybutene or mixtures thereof comprises 15 to 30% by weight of the second layer.

16. A method of waterproofing an area of potential water leakage comprising disposing a multi-layer article of manufacture in contact with said area of potential water leakage to provide a polymeric sheet primary seal and a bentonite composition secondary seal, said multi-layer article of manufacture comprising a first layer of a water-impermeable sheet of polymeric material adhered to a water-swellable clay composition second layer, wherein the second layer has essentially no silicic filler and comprises a water-swellable clay in an amount of 35% to 90% by weight of the second layer, an elastomer in an amount of 1% to 20% by weight of the second layer, and a plasticizer capable of extending said elastomer in an amount of 2% to 50% by weight of the second layer.

17. The method of claim 16 wherein said clay comprises bentonite in an amount of 50% to 80% by weight of the second layer; wherein said elastomer comprises 2% to 10% by weight of the second layer; and wherein said plasticizer comprises at least 10% by weight of the second layer.

18. The method of claim 1 wherein said multi-layer article is disposed beneath a plurality of concrete slabs with the polymeric material disposed below and in contact with the concrete slabs.

19. The method of claim 12 wherein said multi-layer article is disposed beneath a plurality of concrete slabs with the polymeric material disposed below and in contact with the concrete slabs.

20. The method of claim 13 wherein said multi-layer article is disposed beneath a plurality of concrete slabs with the polymeric material disposed below and in contact with the concrete slabs.

* * * * *